United States Patent Office 3,207,814
Patented Sept. 21, 1965

3,207,814
CARBONATE-POLYESTER COPOLYMER
RESINOUS COMPOSITIONS
Eugene P. Goldberg, Des Plaines, Ill., assignor to General Electric Company, a corporation of New York
No Drawing. Filed Jan. 3, 1961, Ser. No. 80,020
7 Claims. (Cl. 260—860)

This invention relates to copolymer compositions having desirable physical, chemical and electrical properties, and to their preparation. More particularly, it relates to copolymer polycarbonate compositions derived from aliphatic dihydroxy compounds and dihydric phenol compounds and dibasic acids.

Various types of polycarbonate resins are known, among which are those prepared by the vinyl polymerization of unsaturated carbon esters such as allyl carbonates and the like, from the ester interchange of carbonate esters with glycols and by the reaction dihydroxy monoaryl compounds such as hydroquinone and resorcinol with phosgene or carbonate esters. Such polycarbonate materials, generally speaking, are of limited usefulness because they do not have a desirable community of physical and chemical properties.

I have discovered a new class of copolymer polycarbonate compositions characterized by desirable physical, chemical and electrical properties. In general, my new compositions may range from relatively low softening point to high melting materials possessing desirable tensile strength, impact strength, and other physical characteristics. Particularly, they are characterized by very desirable thermal-oxidative characteristics as compared with usual polycarbonate resins. The materials are low in density, are almost colorless, and are oil, acid and base resistant to a remarkable degree. On the other hand, they are readily soluble in certain organic solvents so that they can be easily made available in various forms from solutions such as fibers and films. The materials may also be readily fabricated into films and parts by usual molding and extrusion methods and are useful in fluidized resin bed coating processes. Fibers can be spun from the melt condition as well as from solution. The materials can range from soft, limp, elastomeric materials to those which are tough and rigid.

Briefly stated, the compositions of this invention comprise linear carbonate copolymers containing structural units derived from dihydric phenols, aliphatic dihydroxy compounds or glycols, and difunctional acids, the desired units occurring in various manners in the copolymer chain. The polymers, for example, may be of a random type, i.e., the structural units derived from the dihydric phenol, glycol and difunctional acids are propagated along the copolymer chain in a random fashion. Typical of such random copolymers are those resulting from the use of monomeric glycols, monomeric dihydric phenols, and monomeric difunctional acids. Others may be of a random-block type, i.e., the units making up the copolymer are randomly arranged, but at least one of the unit structures is polymeric in nature Typical of random-block copolymers are those in which either the glycol, dihydric phenol, or difunctional acid derived structural unit is polymeric. Still other copolymers are of the block-block type in which the structural units derived from the various components are polymeric in and of themselves.

In general, any aliphatic dihydroxy compound or glycol can be used. Included are the lower molecular weight, aliphatic dihydroxy compounds such as ethylene glycol, propanediols, butanediols, pentanediols, hexanediols, including pinacol, heptanediols, octanediols, neopentyl glycol, aryl-alkyl glycols such as 4,4'-dihydroxyethylidiphenyl, styrene glycol, xylylene glycols, dihydroxy alkyl ethers of dihydric phenols such as the dihydroxy ethyl ether of Bisphenol-A, thiodiglycols and cycloaliphatic glycols such as 1,4-dihydroxycyclohexane, 2,2-bis-(4-hydroxycyclohexyl)-propane, bis-(4-hydroxycyclohexyl)-methane, among others. Among the useful higher molecular weight alpihatic dihydroxy compounds are the polyethylene glycols, polystyrene glycols, polypropylene glycols, polybutylene glycols, polthioglycols, polyaryl-alkyl ether glycols and copolymer polyether glycols, the latter typified by polyethylene glycol, polypropylene glycol copolymers sold by Wyandotte Chemical Company and known as Pluronics, etc. Included also are dihydroxy compounds such as may be derived from dibasic acids and glycols, for example, the diethyleneglycol ester of adipic acid, or the diethyleneglycol ester of sebacic acid, the dineopentyl glycol ester of adipic acid or terephthalic acid, etc. Further glycols useful in connection with the invention are silanediols such as diphenylsilanediol, dimethylsilanediol, dimethylsilanediol dimer, methylphenylsilanediol, ethylphenylsilanediol, etc. Tertiary amino-glycols are also useful, including among others N-phenyldiethanolamine, N - methyldiethanolamine, N-propyldiethanolamine and N-phenyldi-n-propanolamine. Any polymeric aliphatic material having hydroxyl end groups is useful, including polyethers, polyesters, polyurethanes, polyacetals and polysiloxanes. Furthermore, polymers terminated with —COCl groups, for example, polyesters prepared from dibasic acid chlorides, are useful, as are polymers having —OCOCl end groups, such as polycarbonates prepared from phosgene. The aliphatic dihydroxy compounds or glycols can typically be represented by the formula

I

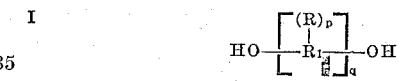

where R is a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents thereon, such as halogen (chlorine, bromine, fluorine, etc.). It will be understood that where more than one R is used, they may be alike or different, $R_1$ can be selected from the group consisting of alkylene and alkylidene residues such as methylene, ethylene, propylene, propylidene, isopropylidene, butylene, butylidene, isobutylidene, amylene, isoamylene, amylidene, isoamylidene, etc. $R_1$ can also be a silane radical or can be polyalkoxy such as polyethoxy, polypropoxy, polythioethoxy, polybutoxy, polyphenylethoxy, polydiphenylsiloxy, polymethylphenylsiloxy, etc. $R_1$ can also consist of two or more alkylene or alkylidene groups as above, separated by the residue of an aromatic nucleus, a tertiary amino radical, an ether radical, a carbonyl radical, a silane radical, or by a sulfur containing radical such as sulfide, sulfoxide, sulfone, etc. $R_1$ may also be a glycol dibasic acid ester residue derived from, for example, dibasic acids such as adipic, azelaic, sebacic, isophthalic, terephthalic and glycols such as have been disclosed above. Other groupings which can be represented by $R_1$ will occur to those skilled in the art. The ester residue can be polymeric or monomeric. The subscript $p$ is a whole number including zero to a maximum determined by the number of replaceable hydrogens on $R_1$. The subscript $q$ is an integer which may be varied as desired and $R_1$, where $q$ is more than 1, may be like or different radicals. It is understood, of course, that mixtures of different glycols may be used and where glycol is mentioned, such mixtures are considered to be included.

Any dihydric phenol compound is useful in the practice of the invention. The dihydric phenol compounds used in connection with the invention can typically be represented by the general formula II 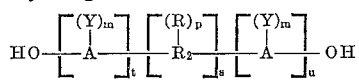

where R is a monovalent hydrocarbon radical as above, $R_2$ is selected from the group consisting of an alkylene and alkylidene residue in the same sense as $R_1$ or an ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silene radical or by a sulfur-containing radical such as sulfide, sulfoxide, sulfone, etc. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers including zero. When $s$ is zero, however, either $t$ or $u$ may be zero and not both.

In the dihydric phenol compound, the substituents Y may be the same or different. When $p$ is greater than one, the R's may be alike or different. Monovalent hydrocarbon radicals designated by R can be the same as those in reference to the compound of Formula I above, as may be those represented by $R_1$. Among the substituents represented by Y are halogen (e.g., chlorine, bromine, fluorine, etc.) or oxy radicals of the formula OW, where W is a monovalent hydrocarbon radical similar to R. Other inert substituents such as a nitro group can be represented by Y. Where $s$ is zero in Formula II, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include, 2,2-bis-(4-hydroxyphenyl)-propane (Bisphenol-A); 2,4'-dihydroxydiphenyl-methane; bis-(2-hydroxyphenyl)-methane; bis - (4 - hydroxyphenyl-methane; bis-(4-hydroxy-5-nitrophenyl)-methane; bis-(4-hydroxy-2,6-dimethyl-3-methoxyphenyl-methane; 1,1-bis-(4--hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)-pentane; 3,3-bis-(4-hydroxyphenyl)-pentane; 2,2-bis-(4-hydroxyphenyl)-heptane; bis-(4-hydroxyphenyl)-phenyl methane; bis-(4-hydroxyphenyl)-cyclohexyl methane; 1,2 - bis-(4-hydroxyphenyl)-1,2-bis-(phenyl)-ethane; 2,2-bis-(4-hydroxyphenyl)-1,3-bis-phenyl)-propane; 2,2-bis-(4-hydroxyphenyl)-1-phenyl propane; and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones such as those set forth in application Serial No. 613,817, filed October 4, 1956, assigned to the same assignee as this invention are also useful, e.g., bis-(p-hydroxyphenyl)-sulfone; 2,4'-dihydroxydihphenyl sulfone, 5'-chloro-2,4'-dihydroxydiphenyl sulfone, 5'-chloro-2',4-dihydroxydiphenyl sulfone; 3'-chloro-4,4'-dihydroxydiphenyl sulfone; bis - (4 - hydroxyphenyl diphenyl disulfone etc. The preparation of these and other useful sulfones is described in Patent 2,288,282—Huissmann. Polysulfones as well as substituted sulfones using halogen, nitrogen, alkyl radicals, etc. are also useful. Dihydroxy aromatic ethers such as those set forth in application Serial No. 598,768, filed July 19, 1955, now U.S. Patent No. 3,148,172 assigned to the same assignee as this invention are also useful. Methods of preparing such materials are found in Chemical Reviews, 38, 414–417 (1946), and Patent 2,739,171—Linn. Exemplary of such dihydroxy aromatic ethers are p,p'-dihydroxydiphenyl ether; p,p'-dihydroxytriphenyl ether; the 4,3'-, 4,2'-, 4,1'-, 2,2'-, 2,3'-, etc. dihydroxydiphenyl ethers; 4,4'-dihydroxy-2,6-dimethyldiphenyl ether; 4,4'-dihydroxy - 2,5 - dimethyldiphenyl ether; 4,4'-dihydroxy-3,3'-di-isobutyldiphenyl ether; 4,4'-dihydroxy-3,3'-diisopropyldiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4-dihydroxytetraphenyl ether; 4,4'-dihydroxypentaphenyl ether; 4,4' - dihydroxy - 2,6-dimethoxydiphenyl ether; 4,4'-dihydroxy-2,4-diethoxydiphenyl ether, etc. Mixtures of the dihydric phenols can also be employed and where dihydric phenol is mentioned herein, mixtures of such materials are considered to be included.

In general, any difunctional carboxylic acid conventionally used in the preparation of linear polyesters may be used for the preparation of the copolyesters of the present invention. The carboxylic acids which are useful are aliphatic carboxylic acids, aliphatic-aromatic carboxylic acids or aromatic carboxylic acids. Of course, the corresponding acid halides are also useful.

The acids which are useful will generally conform to the formula

III 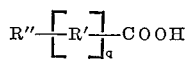

in which R' is an alkylene, alkylidene or cycloaliphatic group in the same manner as set out above for $R_1$ in Formula I; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by $R_2$ in Formula II; an aralkyl radical such as tolylene, xylylene, etc. R" is either a carboxyl or a hydroxyl group. $q$ is one where R" is a hydroxyl group and either zero or one where R" is a carboxyl group.

Included within the scope of this invention are the saturated, aliphatic dibasic acids derived from straight chain paraffin hydrocarbons, such as oxalic, malonic, dimethyl malonic, succinic, glutaric, adipic, pimelic, suberic, azelaic and sebacic acid. Also included are the halogen-substituted aliphatic dibasic acids. Aliphatic carboxylic acids containing hetero atoms in their aliphatic chain, such as thio-diglycollic or diglycollic acid may also be used. Also useful are such unsaturated acids as maleic or fumaric.

Suitable examples of aromatic and aliphatic-aromatic dicarboxylic acids which may be used are phthalic, isophthalic, terephthalic, homophthalic, o-, m-, and p-phenyl-enediacetic acid; the polynuclear aromatic acids such as diphenic acid, and 1,4 naphthalic acid.

Examples of hydroxy acids are the alphatic hydroxy acids such as hydroxybutyric acid, glycollic acid, and latic acid. Examples of aromatic and aliphatic-aromatic hydroxy acids are mandelic acid, p-, m- and o-hydroxy benzoic acid. The hydroxy-substituted long-chain fatty acids, such as 12-hydroxystearic acid, may also be used. Cycloaliphatic acids including tetrachydroisophthalic, 3,6-endomethylenetrahydrophthalic acid (also known as Carbic or Nadic acid), hexachloro-3,6-endomethylenetetrahydrophthalic acid (also known as Chlorendic acid) or camphoric acid may also be used.

Other useful acids are the polymerized fatty acids as, for example, those sold under the trade name "Empol" by the Emery Company, one example of which is Empol 3079–S, which is a linoleic acid dimer containing two carboxyl groups per molecule. Mixtures of the carboxylic acids can also be employed and where carboxylic acid is mentioned herein, mixtures of such materials are considered to be included.

Generally speaking, the materials of the invention are prepared by reacting a dihydric phenol compound, a carbonate precursor such as phosgene, a carbonate ester, etc., an aliphatic dihydroxy material or glycol, and a difunctional acid.

When a carbonate ester is used, the materials are reacted at temperatures of from about 150° C. to 300° C. or higher for times varying from 1 to 15 or more hours. Under such conditions a diester of the difunctional acid is preferably used and an ester interchange occurs between the carbonate ester and acid diester and the dihydric phenol compound and aliphatic dihydroxy compound. The ester interchange is advantageously carried out at reduced pressures of around 10 to 100 mm. of mercury, preferably in an inert atmosphere such as of nitrogen, argon, krypton, etc. to prevent undesirable oxidative effects, especially where higher reaction temperatures are used under moderate subatmospheric pressures. Heating under vacuum after the ester interchange is substantially complete (vacuum cooking), for example, at from 150° C. to 300° C. at 0.01 to 5 to 10 mm. of mercury for extended periods of time tends to increase the molecular weight of the carbonate polymer.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum iron cobolt, nickel silver, gold, tin, antimony, lead barium, strontium platinum, palladium, etc. and compounds thereof such as alcoholates, oxides, carbonates, acetates, hydrides, etc. Additional catalysts and variations in the ester exchange methods are discussed in Groggins, Unit Processes in Organic Synthesis (4th Edition, McGraw-Hill Book Company, 1952), pages 616 to 620. The amount of such catalyst is usually quite small and is of the order of 0.001 to 0.01 percent by weight, based on the total weight of the reactants.

The diaryl carbonates useful in this connection can be represented by the general formula

IV

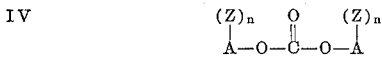

where A is an organic residue in the same sense as in Formula II, Z is an inorganic or organic radical in the same sense as Y of Formula II, and $n$ is an integer. Examples of carbonate esters comprise symmetrical carbonates, for example, diphenyl carbonate, di-(halo-phenyl) carbonates, e.g., di-(chlorophenyl) carbonate, di-(bromophenyl) carbonate; di-(polyhalophenyl) carbonates, e.g., di-(trichlorophenyl) carbonate, di-(tribromophenyl) carbonate, etc.; di-(alkylphenyl) carbonates, e.g., di-(tolyl) carbonate, etc.; di-(naphthyl) carbonate, di-(chloronaphthyl) carbonate, etc.; unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem., 36, 271 (1916) and Copisarow, J. Chem. Soc. (Brit.) 1929, 251, both of whom disclose preparing dicresyl carbonate by treating the alkali metal salts of p-cresol with phosgene, and U. S. Patent 2,362,865—Tyron et al., which discloses preparing diphenyl, ditolyl, and dinaphthyl carbonates by passing phosgene through a column of the phenol in the presence of a catalyst, etc.

Employing the above method of preparing the present copolymers by ester interchange, using a vacuum cook, the products in the final stages of the reaction become quite viscous and difficult to handle. In addition, the ester exchange process is not entirely satisfactory for preparing block copolymers when certain high molecular weight glycol materials such as polyester glycols are used, due to ester exchange reactions involving the polyester linkages of the glycol itself. I, therefore, prefer generally to carry out the reaction using phosgene or phosgene-like dibasic acid halide in an organic basic material such as a tertiary amine (e.g., pyridine, dimethylaniline, quinoline, etc.). The base can be used undiluted or diluted with inert solvents, for example, hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction. Although the phosgene reaction can be carried out over a wide range of temperatures, for example, from below 0° C. to over 100° C., the reaction proceeds satisfactorily at 25° to 50° C. Since the reaction is exothermic, the rate of phosgene addition can be used to control the reaction temperature. Substantially, equimolar amounts of phosgene can be used, although an excess of up to 1.5 moles or more may be employed. The concentration of the dihydroxy reactants in solvent can also be varied, although I prefer for convenience a mixture containing from about 1 percent to 25 percent by weight of dihydroxy compounds.

In general, the reaction is carried out by dissolving the dihydroxy reactants and the diacid or diacid halide, or difunctional acid in the base, such as pyridine, and then bubbling phosgene into the stirred solution at the desired rate. The copolymer formed is separated and purified by any suitable means as by pouring the reaction product into a stirred liquid capable of effecting precipitation, for example, hydrocarbons, alcohols, etc. The precipitation can also be carried out by the addition of a non-solvent to the copolymer solution. Anhydrous precipitants are preferred but water can also be used. After filtration, the precipitate is washed with a material capable of removing pyridine and pyridine hydrochloride to yield, upon drying, a finely divided product. Isopropanol is conveniently used both as a precipitating and washing agent.

Suitable phosgene-like dibasic acid halides, in addition to phosgene, include, for example, dibromo and diiodo-carbonyls as well as the bishaloformates of dihydric phenols (e.g., bischloroformates of hydroquinone, Bis Phenol-A, etc.) or glycols (e.g. bischloroformates of ethylene glycol, neopentyl glycol, polyethylene glycol, etc.). Other carbonate precursors will occur to those skilled in the art.

Copolymers can also be prepared by adding phosgene and the diacid halide to an aqueous alkaline solution or suspension of the dihydroxy reactants. This is preferably done in the presence of inert solvents such as methylene chloride, benzene, toluene and the like. Quaternary ammonium compounds can be used to catalyze the reaction.

It will be seen that the copolymers of the present invention will comprise at least two of the following four units in the linear chain:

V 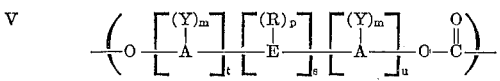

VI 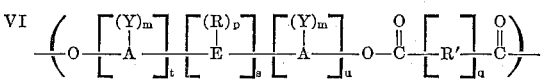

VII 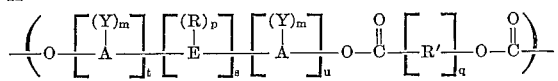

VIII 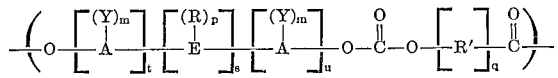

where the letters have the meanings given above and at least one of the three following units:

IX 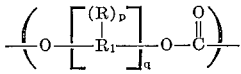

X 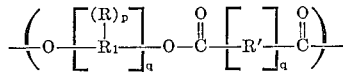

XI 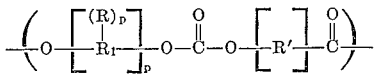

where the letters have the same meanings as above.

The following examples illustrate the preparation of copolymers of the present invention.

All resins were prepared in a resin pot equipped with a stirrer, thermometer, gas inlet, tube and vent. Phosgene was bubbled into the reaction mixture, containing dry pyridine, at a rate of about 0.2 g. per minute, the temperature being maintained at about 30° C. The resins were precipitated and washed with isopropanol in a Waring Blendor and dried at 80° C. for from about 16 to 24 hours. The quantities of the additional materials used in each example along with the physical properties of the materials are shown in the table below.

The intrinsic viscosity, $\eta i$, was determined at 30.3° C. in dioxane and all physical tests were carried out in accordance with ASTM D638–58T. Tensile strength data were obtained with 6 to 8 mil thick films cast from $CH_2-Cl_2$ solution and an Instron machine was used for tensile test. In the table, Y equals yield strength in p.s.i., U equals ultimate tensile strength in p.s.i., %E equals percent elongation, TE equals tensile energy or the area under the stress-strain curve in foot pounds per inch cube.

The relatively low softening temperatures of some of the present materials as compared with usual polycarbonate materials makes them particularly attractive in applications which require working or fabrication at relatively low temperatures. The present materials can very conveniently be made into films, fibers and molded materials that are particularly useful by reason of their chemical, physical and thermal properties as surface coatings for wires and other base structures. They can readily be employed in varnish and paint products. As pointed out above, they can be prepared in forms ranging from soft, limp, elastomeric materials to those which are tough and relatively hard, and because of this extreme versatility lend themselves to a multitude of uses.

| Example | Dihydric Phenol (grams) (moles) | Glycol (grams) (moles) (percent) | Acid (grams) (moles) (percent) | $\eta i$ | Soft. Temp., °C. | Wt. Loss (24 hrs. 200° C.) | Tensile Strength | | | | |
|---|---|---|---|---|---|---|---|---|---|---|---|
| | | | | | | | Y | U | Percent E | TE | Temp., °C. |
| 1 | BPA (5.0) (0.022) | 4000 CBX (5.0) (0.00013) (50 wt. percent) | Isophtahalic (1.88) (0.011) (50 mole percent) | 0.63 | 65–80 | 4.6 | 280 | 6,310 | 470 | 865 | [1] 25 |
| 2 | BPA (7.0) (0.031) | 4000 CBX (2.1) (0.0005) (23 wt. percent) | Isophthalic (2.55) (0.015) (50 mole percent) | 1.08 | 120–160 | 7.1 | 8,540 270 240 | 8,190 3,590 1,210 | 135 310 390 | 820 360 145 | [2] 25 [1] 120 [2] 120 |
| 3 | BPA (5.5) (0.024) | 4000 CBX (5.5) (0.0014) (50 wt. percent) | Isophthalic (1.0) (0.006) (25 mole percent) | 0.75 | 30–50 | 6.8 | | | | | |
| 4 | BPA (5.0) (0.022) | 4000 CBX (5.0) (0.0013) (50 wt. percent) | Isophthalic (2.7) (0.016) (75 mole percent) | 0.30 | 35–55 | 26.2 | | | | | |
| 5 | BPA (5.0) (0.022) | 4000 CBX (5.0) (0.0013) (50 wt. percent) | Terephthalic (1.83) (0.011) (50 mole percent) | 0.87 | 70–90 | 13.1 | 560 | 7,140 | 370 | 830 | [1] 25 |
| | | | | | | | (98% elastro recovery—elongated 100%, relaxed 1 min.) | | | | |
| 6 | BPA (5.0) (0.022) | 20000 CBX (5.0) (0.0003) (50 wt. percent) | Isophthalic (1.83) (0.011) (50 mole percent) | Insoluble | 30–50 | 13.8 | | | | | |
| 7 | BPA (5.5) (0.024) | 4000 CBX (5.5) (0.0014) (50 wt. percent) | Adipic (1.75) (0.012) (50 mole percent) | 0.87 | 55–85 | 10.7 | 145 | 90 | 1,760 | 120 | [1] 25 |
| 8 | BPA (5.7) (0.025) | 1,6-Hexanediol (2.95) (0.025) (50 mole percent) | Isophthalic (4.15) (0.025) (50 mole percent) | 0.44 | 35–50 | | | | | | |
| 9 | BPA (5.93) (0.026) | Ethylene Glycol (1.61) (0.026) (50 mole percent) | Terephthalic (4.32) (0.026) (50 mole percent) | 1.27 | 150–200 | 4.7 | 8,660 2,650 | 7,650 3,610 | 105 140 | 615 325 | [2] 25 [2] 120 |
| 10 | BPA (5.0) (0.022) | Poly(neopentyl adipate) [3] (5.0) (50 wt. percent) | Isophthalic (1.83) (0.011) (50 mole percent) | 0.56 | 45–70 | 1.1 | 2,140 | 5,880 | 275 | 725 | [1] 25 |
| 11 | BPA (5.0) (0.022) | Poly(neopentyl adipate) [3] (5.0) (50 wt. percent) | Terephthalic (1.83) (0.011) (50 mole percent) | 0.51 | 60–80 | | 1,450 | 3,810 | 285 | 575 | [1] 25 |

See footnotes at end of tables.

| Example | Dihydric Phenol (grams) (moles) | Glycol (grams) (moles) (percent) | Acid (grams) (moles) (percent) | $\eta i$ | Soft. Temp., °C. | Wt. Loss (24 hrs. 200° C.) | Tensile Strength ||||| 
|---|---|---|---|---|---|---|---|---|---|---|---|
| | | | | | | | Y | U | Percent E | TE | Temp., °C. |
| 12 | Hydroquinone (4.5) (0.041) | Poly(neopentyl adipate)³ (4.5) (50 wt. percent) | Isophthalic (3.3) (0.02) (50 mole percent) | 0.21 | 125-300 | 1.5 | Partially soluble in dioxane, insoluble in CH₂Cl₂ |||||

¹ 20″/min. crosshead speed.
² 2″/min. crosshead speed.
³ Hydroxyl terminated polyester—prepared using excess glycol.
CBX—a polyethylene glycol of molecular weight indicated.
BPA—Bis Phenol-A.

What I claim as new and desired to secure by Letters Patent of the United States is:

1. A linear, random-block carbonate copolymer of (1) a dihydric phenol, (2) a difunctional carboxylic acid in which the second functional group is selected from the class consisting of a carboxyl group and a hydroxyl group, (3) a hydroxyl-terminated polyester of a dicarboxylic acid and a glycol, and (4) carbonic acid.

2. A linear, random-block carbonate copolymer of (1) a dihydric phenol, (2) a difunctional carboxylic acid in which the second functional group is selected from the class consisting of a carboxyl group and a hydroxyl group, (3) a hydroxyl-terminated polyester of adipic acid and neopentyl glycol, and (4) carbonic acid.

3. A linear, random-block carbonate copolymer of (1) a dihydric phenol, (2) isophthalic acid, (3) a hydroxyl-terminated polyester of adipic acid and neopentyl glycol, and (4) carbonic acid.

4. A linear, random-block carbonate copolymer of (1) a dihydric phenol, (2) terephthalic acid, (3) a hydroxyl-terminated polyester of adipic acid and neopentyl glycol, and (4) carbonic acid.

5. A linear, random-block carbonate copolymer of (1) 2,2-bis-(4-hydroxyphenyl) propane, (2) a difunctional carboxylic acid in which the second functional group is selected from the class consisting of a carboxyl group and a hydroxyl group, (3) a hydroxyl-terminated polyester of adipic acid and neopentyl glycol, and (4) carbonic acid.

6. A linear, random-block carbonate copolymer of (1) 2,2-bis-(4-hydroxyphenyl) propane, (2) isophthalic acid, (3) a hydroxyl-terminated polyester of adipic acid and neopentyl glycol, and (4) carbonic acid.

7. A linear, random-block carbonate copolymer of (1) 2,2-bis-(4-hydroxyphenyl) propane, (2) terephthalic acid, (3) a hydroxyl-terminated polyester of adipic acid and neopentyl glycol, and (4) carbonic acid.

References Cited by the Examiner

UNITED STATES PATENTS 3,000,849    9/61    Clachan et al. _____ 260—47

FOREIGN PATENTS 824,423    12/59    Great Britain.
1,211,559    3/60    France.

MURRAY TILLMAN, *Primary Examiner.*

HAROLD N. BURSTEIN, JAMES A. SEIDLECK,
*Examiners.*